(12) United States Patent
Yip et al.

(10) Patent No.: US 10,609,412 B2
(45) Date of Patent: Mar. 31, 2020

(54) METHOD FOR SUPPORTING VR CONTENT DISPLAY IN COMMUNICATION SYSTEM

(71) Applicant: Samsung Electronics Co., Ltd., Suwon-si, Gyeonggi-do (KR)

(72) Inventors: Eric Yip, Seoul (KR); Byeong-Doo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/076,490

(22) PCT Filed: Feb. 10, 2017

(86) PCT No.: PCT/KR2017/001494
§ 371 (c)(1),
(2) Date: Aug. 8, 2018

(87) PCT Pub. No.: WO2017/138776
PCT Pub. Date: Aug. 17, 2017

(65) Prior Publication Data
US 2019/0045222 A1 Feb. 7, 2019

(30) Foreign Application Priority Data
Feb. 12, 2016 (KR) .................. 10-2016-0016508

(51) Int. Cl.
*H04N 19/597* (2014.01)
*H04N 5/265* (2006.01)
(Continued)

(52) U.S. Cl.
CPC .......... *H04N 19/597* (2014.11); *H04N 5/265* (2013.01); *H04N 5/268* (2013.01); *H04N 5/2624* (2013.01);
(Continued)

(58) Field of Classification Search
CPC .. H04N 19/597; H04N 19/124; H04N 19/162; H04N 19/174; H04N 19/31;
(Continued)

(56) References Cited

U.S. PATENT DOCUMENTS

2012/0120069 A1  5/2012  Kodaira et al.
2012/0169842 A1  7/2012  Chuang et al.
(Continued)

FOREIGN PATENT DOCUMENTS

JP    2012-053896 A    3/2012
KR    10-2012-0133006 A    12/2012
KR    10-1340598 B1    12/2013

*Primary Examiner* — Michael E Teitelbaum
(74) *Attorney, Agent, or Firm* — Jefferson IP Law, LLP

(57) ABSTRACT

The present disclosure provides a method for displaying a 360 degree image, capable of performing encoding in tile unit defined as a part of the 360 degree image according to the position occupied within the 360 degree image, the method comprising: an operation for requesting at least one tile corresponding to a view region to be displayed so as to correspond to the viewpoint of a user; an operation for receiving at least one tile corresponding to the view region and decoding the at least one tile received; and an operation for rendering the at least one tile decoded.

11 Claims, 9 Drawing Sheets

(51) Int. Cl.
    *H04N 21/2343*    (2011.01)
    *H04N 21/442*    (2011.01)
    *H04N 21/81*    (2011.01)
    *H04N 5/262*    (2006.01)
    *H04N 5/268*    (2006.01)
    *H04N 21/218*    (2011.01)
    *H04N 21/6587*    (2011.01)
    *H04N 19/124*    (2014.01)
    *H04N 19/162*    (2014.01)
    *H04N 19/174*    (2014.01)
    *H04N 19/31*    (2014.01)
    *H04N 19/33*    (2014.01)
    *G03B 37/04*    (2006.01)

(52) U.S. Cl.
    CPC ......... *H04N 19/124* (2014.11); *H04N 19/162* (2014.11); *H04N 19/174* (2014.11); *H04N 19/31* (2014.11); *H04N 19/33* (2014.11); *H04N 21/21805* (2013.01); *H04N 21/23439* (2013.01); *H04N 21/44218* (2013.01); *H04N 21/6587* (2013.01); *H04N 21/816* (2013.01); *G03B 37/04* (2013.01)

(58) Field of Classification Search
    CPC .... H04N 19/33; H04N 5/232; H04N 5/23232; H04N 5/2624; H04N 5/265; H04N 5/268; H04N 21/21805; H04N 21/23439; H04N 21/44218; H04N 21/6587; H04N 21/816; G03B 37/04
    See application file for complete search history.

(56) References Cited

U.S. PATENT DOCUMENTS

| | | |
|---|---|---|
| 2014/0119671 A1 | 5/2014 | Lim et al. |
| 2015/0123993 A1 | 5/2015 | Ohba et al. |
| 2016/0148431 A1* | 5/2016 | Seydoux .............. G06T 19/006 345/633 |

* cited by examiner

METHOD FOR SUPPORTING VR CONTENT DISPLAY IN COMMUNICATION SYSTEM

CROSS-REFERENCE TO RELATED APPLICATION(S)

This application is a U.S. National Stage application under 35 U.S.C. § 371 of an International application number PCT/KR2017/001494, filed on Feb. 10, 2017, which is based on and claimed priority of a Korean patent application number 10-2016-0016508, filed on Feb. 12, 2016, in the Korean Intellectual Property Office, the disclosure of which is incorporated by reference herein in its entirety.

TECHNICAL FIELD

The present disclosure relates to displaying virtual reality (VR) content, and relates to a head mount display (HMD), mobile VR, TV VR, a 360-degree image, a viewpoint, and a point of interest.

BACKGROUND ART

Consumer media content is continuously evolving from black and white content to color content, high definition (HD) content, ultra high definition (MD) content, and the like. Recently, the standardization for high dynamic range (HDR) content has been proceeded, and standards for HDR content have been distributed. Meanwhile, VR content had been in an incubation stage before VR devices were distributed.

FIG. 1 illustrates a processing flow for providing VR media content.

The processing flow for VR media content may follow the procedure illustrated in FIG. 1.

For example, an image captured 100 by a video camera may be mastered 102 by a mastering device, encoded/multiplexed 104 by an encoding/multiplexing (Mux) device, and distributed 106 as VR content in various media formats.

The distributed VR content may de-multiplexed (Demux) 108 in a receiving side, transmitted 110 to a display device, and VR displayed 112.

VR content has characteristics significantly different from the conventional 2-dimensional (2D) or 3 dimensional (3D) content. VR content provides a user with an immersive experience by allowing the user to view an image at all of 360 degrees. However, freely viewing an image at 360 degrees by the user means that a content provider partially damages the image provided to the user in an aspect of artistic depiction.

One of the main reasons why the spread of VR content and a device is delayed is that a display quality of VR content is not better than that of fixed view content non-interactively displayed. That is, a screen content quality of current VR technology which consumers experience is poorer than that of fixed view-type content.

While industry recommendations (for example, UHD resolution or HDR, etc) for next-generation content are defined with respect to the fixed view-type content, VR content is restricted by basic issues such as a picture resolution, an insufficient frame rate, and flickering.

Currently, a quality of VR content is limited by resolution. Users are considered as being accustomed to an HD resolution of at least 2K. Accordingly, users expect a resolution of a better quality (more immersive quality) for VR content.

However, a current VR system is limited by a decoder which can support decoding merely up to 4 K (4 K UHD, that is, a resolution of 2160 p).

DETAILED DESCRIPTION OF THE INVENTION

Technical Problem

The present disclosure provides a scheme of providing a high quality display to a user using a stitched 360-degree image with a higher resolution and an improved quality.

The present disclosure provides a scheme of resolving a view region display delay due to feedback input according to a change in a user's viewpoint.

Technical Solution

In accordance with an aspect of the present disclosure, a method of displaying a 360 degree image encoded in the unit of tiles defined as part of the 360 degree image according to a position within the 360 degree image is provided. The method comprises: requesting at least one tile corresponding to a view region to be displayed according to a user's viewpoint; receiving the at least one tile corresponding to the view region and decoding the at least one received tile; and rendering the at least one decoded tile.

In accordance with another aspect of the present disclosure, an apparatus for displaying a 360 degree image encoded in the unit of tiles defined as part of the 360-degree image according to a position within the 360 degree image is provided. The apparatus comprises: a controller configured to request at least one tile corresponding to a view region to be displayed according to a user's viewpoint and receive the at least one tile corresponding to the view region; a decoder configured to decode the at least one received tile; and a display unit configured to render the at least one decoded tile.

In accordance with another aspect of the present disclosure, a method of transmitting a 360 degree image is provided. The method comprises: encoding the 360 degree image in the unit of tiles defined as part of the 360 degree image according to a position within the 360 degree image; receiving a request including an index indicating at least one tile; and transmitting an encoded image of a tile corresponding to the index included in the request, wherein the index included in the request indicates a tile corresponding to a view region to be displayed according to a user's viewpoint.

In accordance with another aspect of the present disclosure, an apparatus for transmitting a 360 degree image is provided. The apparatus comprises: an encoder configured to encode a 360 degree image encoded in the unit of tiles defined as part of the 360 degree image according to a position within the 360 degree image; and a controller configured to receive a request including an index indicating at least one tile and transmit an encoded image of a tile corresponding to the index included in the request, wherein the index included in the request indicates a tile corresponding to a view region to be displayed according to a user's viewpoint.

Advantageous Effects

Even though a display device according to the present disclosure performs decoding having complexity (corresponding to 4 K) the same as that of fixed view type content, an image actually rendered to the user has a significantly high resolution and quality.

MODE FOR CARRYING OUT THE INVENTION

Hereinafter, embodiments of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the definitions of the terms should be made based on the content throughout the specification.

Figure 1:
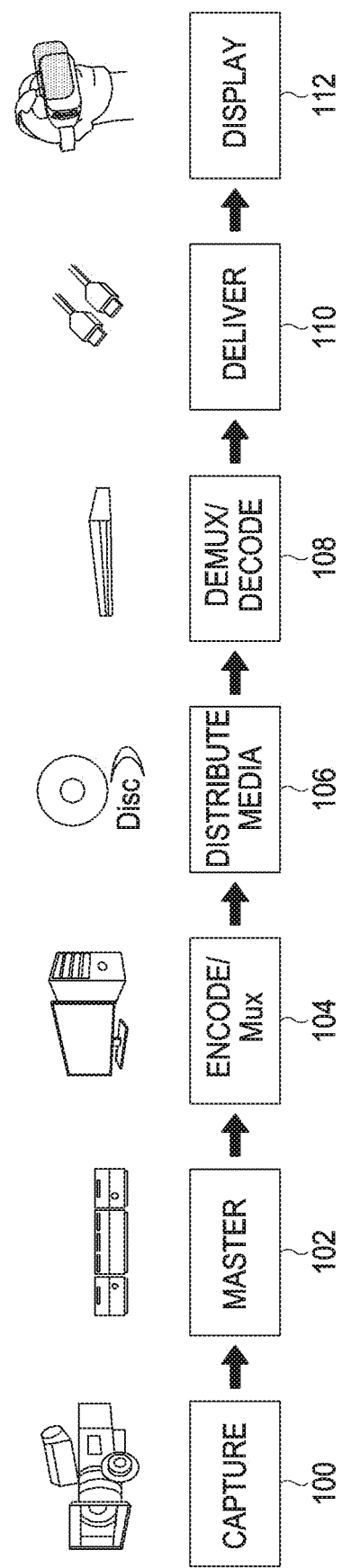
FIG. 1 illustrates a processing flow for providing VR media content.
Figure 2:
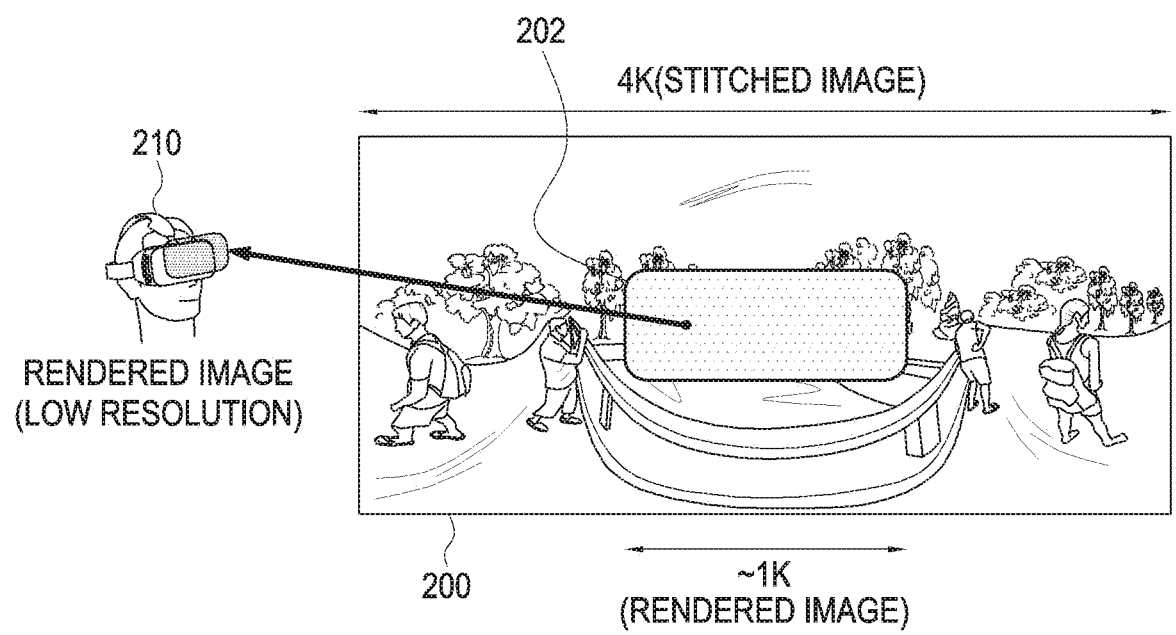
FIG. 2 illustrates a VR view region having a resolution of 1 K within a stitched 360 degree image of a 4 K resolution.

FIG. 2 illustrates a VR view region having a 1 K resolution within a stitched 360-degree image of a 4 K resolution.

A maximum of 4 K resolution is used for one stitched 360-degree image 200. Here, the stitched 360-degree image means a 360-degree image provided by stitching (joining). When reproducing VR content, a VR system decodes the entire 360-degree video image 200 with a resolution of 4 K regardless of a part (or a view region) 202 of the image which the user watches. At this time, VR content actually displayed on the display device 210 corresponds to a part 202 of the 360-degree image 200 of the resolution of 4 K. Accordingly, in the VR system, an actual view region 202 rendered to the user has a low resolution that is approximately 1 K.

Accordingly, a scheme according to the present disclosure may use a stitched 360-degree image having a higher resolution (for example, 8K, 10K, 16K, or other resolutions) instead of limiting the resolution of the 360-degree image to the resolution of 4 K. Further, only a corresponding region according to a user's viewpoint (a region of an image displayed to the user in the 360-degree image, hereinafter referred to as a 'view region') may be decoded in a decoder according to the present disclosure and is shown to the user. Accordingly, the corresponding region may have a resolution corresponding to a maximum decoding capability of the display device, and the user consuming VR content may experience higher quality VR content.

In order to enable viewpoint dependent video encoding and rendering, tasks related to a VR experience may exist. First, in order to make a terminating device, which consumes VR content, receive, decode, and render only a view region corresponding to a viewpoint, a video should be encoded in the unit of fragmented tiles based on a location within a stitched image and delivered to the terminating device. Second, since the user's viewpoint may continuously change (for example, rotate) according to a user's intention, location based delivery of the view region may cause a delay due to a feedback loop response, and the delay should be alleviated.

Prior to the description of operation, construable examples of some terms used herein will be first described below. However, it is noted that the terms are not limited to the examples of the construable meanings which are proposed below.

The display device is a device that outputs VR content described in the present disclosure and may be referred to as display hardware, a processing unit, a user device, a UE, a mobile station (MS), a mobile equipment (ME), a device, a terminal, or the like.

VR content may be a dynamic image such as a video or a still image such as a photo. In the present disclosure, a 360 degree image is described as an example of the VR content. The 360 degree image is an image photographed by a stitching camera and stitched, and may provide a view at all 360 degrees if the user changes a location or orientation.

The VR system means a general environment for supporting VR content consumption by the display device and may be referred to as a VR ecosystem. A fundamental aspect of VR is a system which may monitor the user. The system allows the user to use a kind of controller that provides feedback input to a content display device or a processing unit. The system may control the content in accordance with the feedback input and enable interaction with the user.

The system may include, for example, at least one of approximate configurations (or functions) shown in the following Table.

TABLE 1

| Configuration (or function) | Description |
|---|---|
| Display hardware | Display device or processing unit. For example, HMD, wireless VR, mobile VR, TVs, and cave automatic virtual environments (CAVEs) |
| User controller | Configuration for providing feedback input to VR system (display hardware). For example, peripherals and haptics |
| Content capture | For example, camera, video stitching (for connecting several videos) device |
| Content studio | For example, games, live, cinema, news, and documentary, etc. |
| Industrial application | For example, education, health care, real estate, architecture, and travel, etc. |
| Production tool & service | For example, 3D engine and power processing |
| App stores | Provides app for VR media content |

A user's feedback input through a controller may be divided into 1) orientation tracking, and 2) position tracking. The orientation tracking corresponds to tracking a rotation (that is, a direction of a user's viewpoint) by the controller and has 3 degrees of freedom (DOF). The position tracking is tracking translation (that is, a user's movement) by the controller and has 3 DOF. Accordingly, a maximum of available DOF when the user experiences VR content is 6.

For example, encoding and transmission of the 360 degree image in the unit of tiles will be described.

Figure 3:
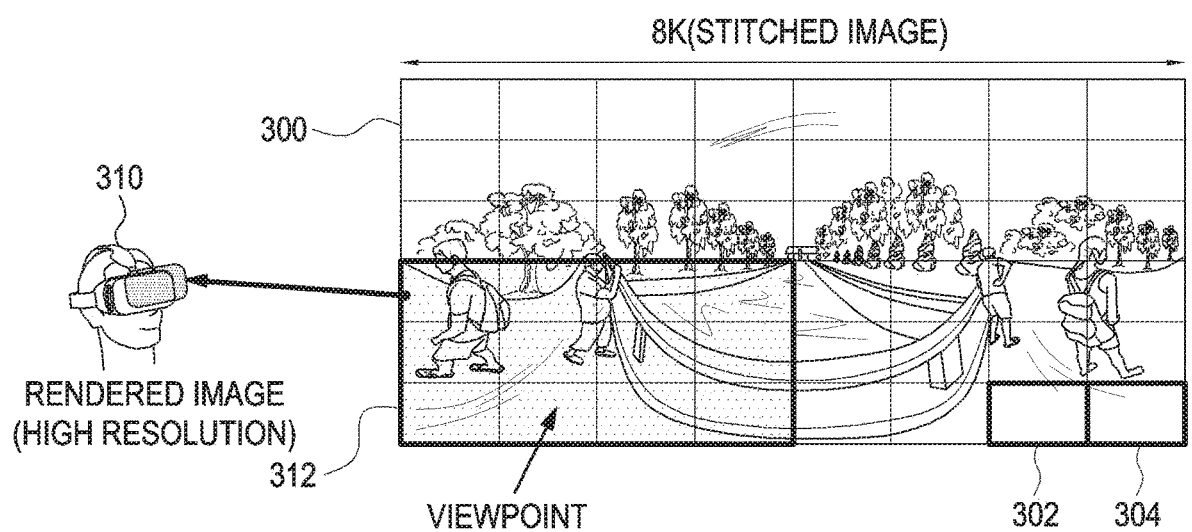
FIG. 3 illustrates a VR view region having a resolution of 4 K within a stitched 360 degree image of a resolution of 8 K.

FIG. 3 illustrates a VR view region having a resolution of 4 K within a stitched 360 degree image of a resolution of 8 K.

Referring to FIG. 3, a stitched 360 degree image 300 may have a resolution of 8 K (8K Full UHD, that is, a resolution of 4320 p). The 360 degree image may be encoded and delivered in the unit of tiles (for example, 302, 304). At this time, a region (that is, the view region) 312 rendered by the display device 310 is a region corresponding to a user's viewpoint. The display device may decode and render only the view region 312, and at this time, the view region may have a resolution of 4 K. Accordingly, the display device may use a maximum decoding capability for rendering the view region, and the user may experience high quality VR content.

Figure 4:
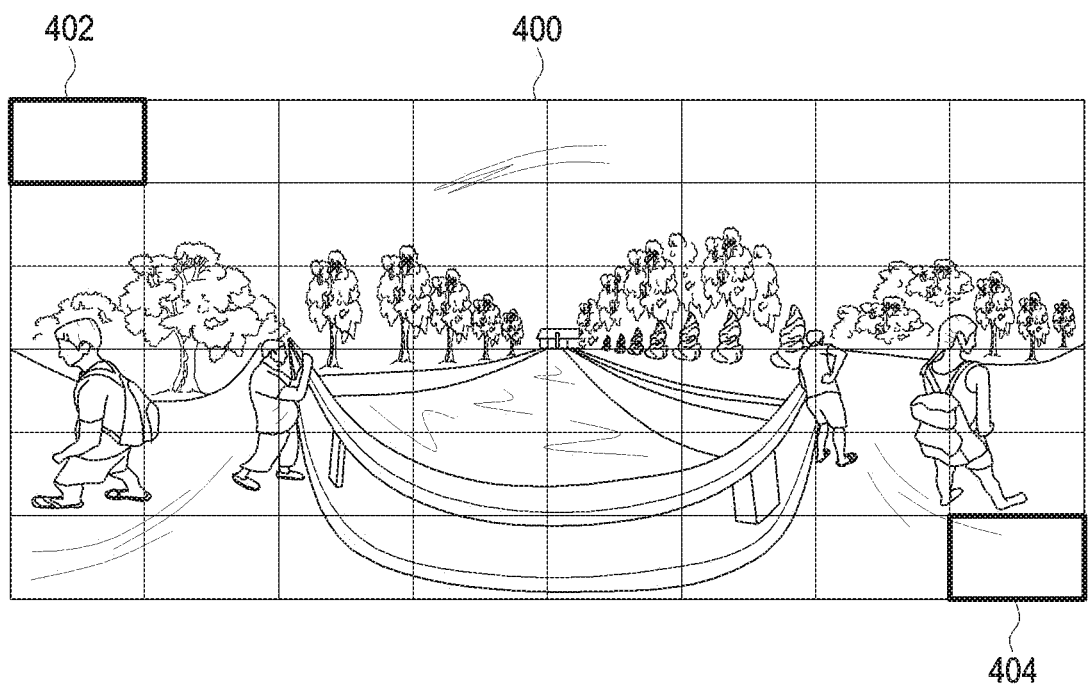
FIG. 4 illustrates tiles fragmented based on a position within a 360 degree image.

FIG. 4 illustrates tiles fragmented based on a position within a 360 degree image.

In the present disclosure, a tile is a part (that is, a unit region of encoding) divided from the 360 degree image 400 in order to encode and transmit one 360 degree image 400. The 360 degree image may include one or more tiles (for example, 402, 404) and may be encoded and transmitted in the unit of at least one tile. The tile 402, 404 may be defined according to a position thereof occupied within the 360 degree image 400.

One tile may or may not overlap another tile within the 360 degree image. Further, each tile is an independent sub-video or sub-image. If one tile references another tile in the past for prediction (that is, one tile is a dependent sub-image), a problem may occur when an I frame (I frame; intra-frame: a frame including all information required for rendering therein), which is not received by the decoder is necessary.

If the display device detects a change in a viewpoint of a viewer, the display device may transmit a parameter (for example, position information, index information, etc. of a changed viewpoint) for the changed viewpoint or a tile related parameter corresponding to the changed viewpoint to a server. Further, the display device may receive a tile corresponding to the changed viewpoint from the server, and decode and render the received tile.

Tile related metadata available to the decoder may include, for example, the following information (parameter).

TABLE 2

| Tile metadata | Number of tiles within 360 degree image |
| --- | --- |
| | Tile position (for example, upper left corner or lower right corner |
| | Tile index for indexing request from client to server (it may be transmitted within hint track whenever a change in user's viewpoint is newly updated) |
| | Information for distinguishing between low resolution and high resolution |

Subsequently, a scheme for mitigating a delay according to view region position based delivery will be described.

The present disclosure proposes a scheme using a safeguard in fetching of tiles by the decoder.

When the user's viewpoint is static, the position of a view region is also not changed, so that a delay problem is not generated and a safety zone for tile fetching is not required. However, the user's viewpoint may be unpredictably changed in all aspects such as the position and orientation. Accordingly, as the safety zone (that is, the safeguard) for preparing for a rapid change in the viewpoint, tiles surrounding or enclosing the user's current viewpoint may be fetched (that is, requested and received) by the display device.

Figure 5:
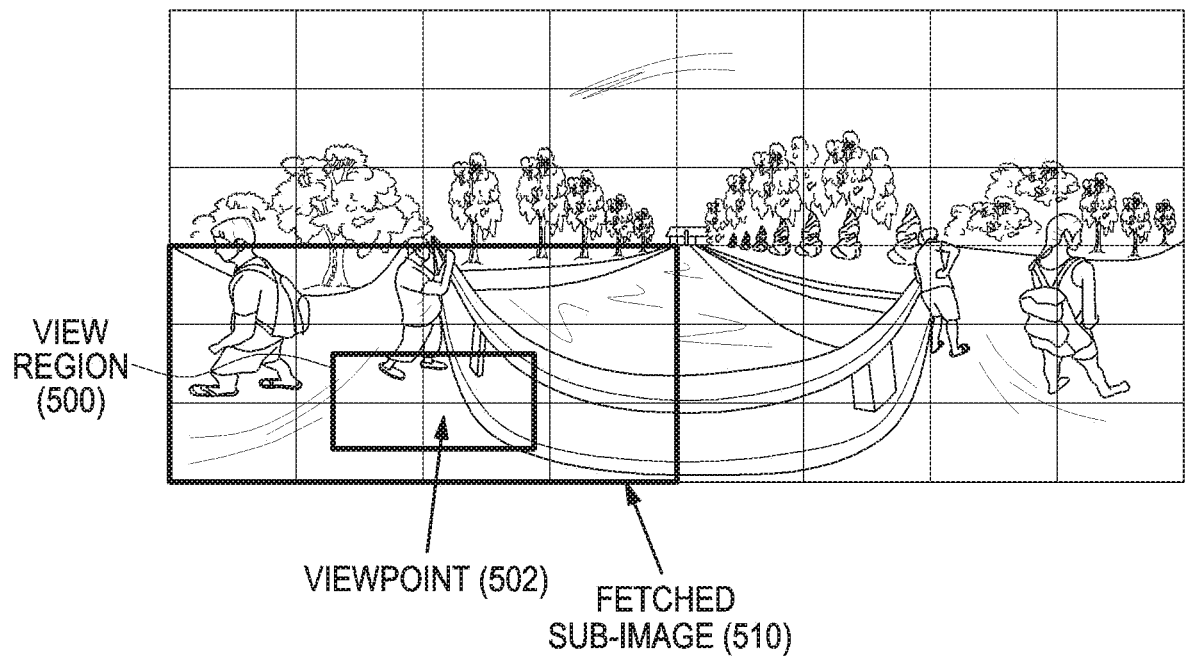
FIG. 5 illustrates all tiles that make up a 360 degree image and tiles (sub-image) fetched by a device based on a user's viewpoint.

FIG. 5 illustrates all tiles that make up a 360 degree image and tiles (a sub-image) fetched by the device based on the user's viewpoint.

Referring to FIG. 5, a sub-image 510 fetched for a view region 500 corresponding to a user's viewpoint 502 at any time is illustrated.

The user may view only a part corresponding to the view region 500 through a VR display device. However, the VR display device may request, receive, and decode all tiles within the sub-image 510 as the safeguard (that is, a region corresponding to the sub-image 510 may be fetched as the safeguard). At this time, a total number of tiles decoded (that is, fetched) by the VR display device may be equal to or smaller than that corresponding to a maximum resolution supported by the decoder. It is not necessary that the received tiles are tiles adjacent to each other within the 360 degree image.

In FIG. 5, the safeguard is determined as a region outside the view region 500 and inside the fetched sub-image 510. A most basic algorithm for determining the region of the safeguard is defining a uniform safeguard region that surrounds the view region 500. However, the uniform safeguard region may not effectively handle the case in which the user quickly moves a head (that is, a rapid change in a viewpoint).

Figure 6:
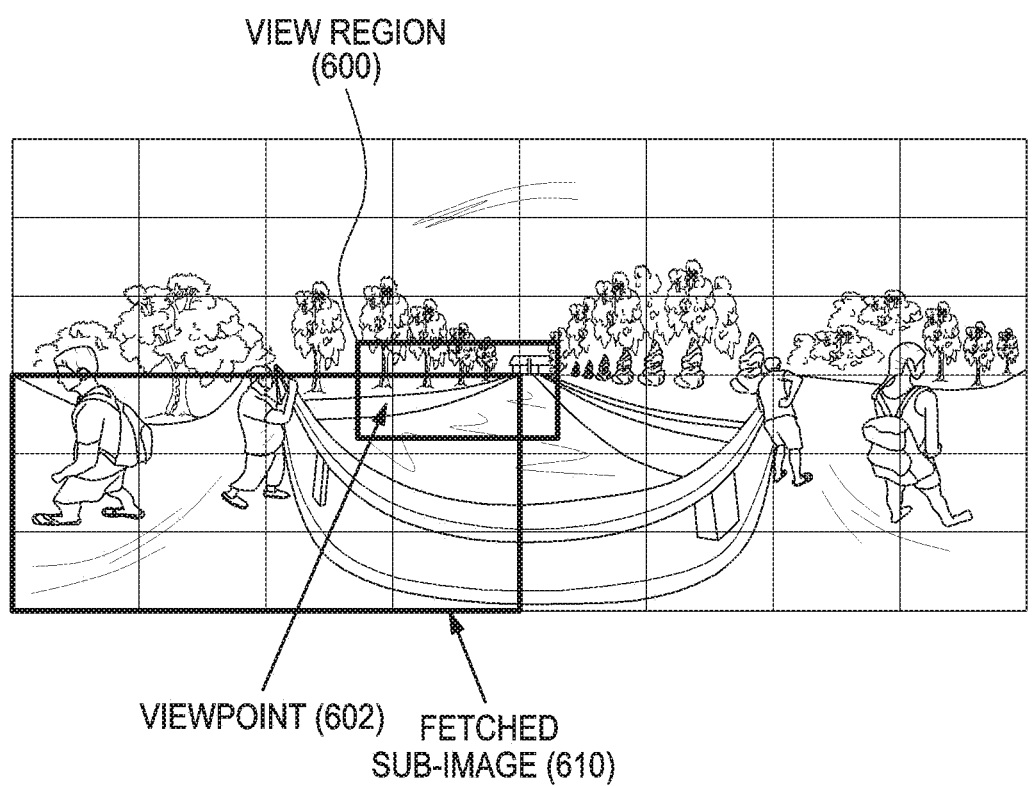
FIG. 6 illustrates the case in which a view region after a change in a user's viewpoint is located outside a sub-image.

FIG. 6 illustrates the case in which a view region after a change in a user's viewpoint is located outside a fetched sub-image.

Referring to FIG. 6, it can be seen that a view region 600 is located outside a region of a fetched sub-image 610 due to a rapid change in a user's viewpoint 602.

Since a rate of the change in the viewpoint (a rate of the change in the viewpoint according to user's intention) is higher than a tile refresh rate (that is, a rate of a procedure in which the device makes a request for, receives, decodes, and renders tiles of the view region corresponding to the changed viewpoint according to user's feedback input), the display device may not display an image region of the view region 600 outside the fetched sub-image 610.

In order to solve the problem, the present disclosure proposes a method using a backup background image having a low resolution and a method using prediction based viewpoint change. The backup background image may be an image for all or some of the 360 degree image. In order to reduce a bit rate consumed for transmitting the backup background image, the backup ground image may be an image having a lower spatial resolution or a lower frame rate than an image corresponding to the tiles of the view region. Selectively, the backup ground image may be an image compressed using a higher quantization parameter than the image corresponding to the tiles of the view region.

When the display device uses the backup ground image having the low resolution, the backup image having the low resolution for the stitched entire image may be received and rendered during the whole reproduction procedure. The display device may prevent display incapability by outputting the rendered backup image having the low resolution in accordance with the rapid viewpoint change. However, with respect to the part corresponding to the moved viewpoint, a tile having a high resolution cannot be fetched or rendered.

When the display device uses a prediction based viewpoint change, the display device may determine a safeguard region using recent viewpoint movement information (or a function of the information) instead of using a uniform safeguard region surrounding the viewpoint. In this case, a sub-image "to be fetched" may be determined by a direct function of recent viewpoint movement information and the current viewpoint. Since general panning (horizontal rotation of the viewpoint) of the user is not irregular to such an extent to randomly move in a plurality of directions (further, since the general panning cannot help being limited to a rotation speed of a user's neck), using information on movement of the viewpoint may reduce a probability of showing a region, which is not fetched in advance, in the current user view region (that is, a probability of not outputting an image within the view region).

Figure 7:
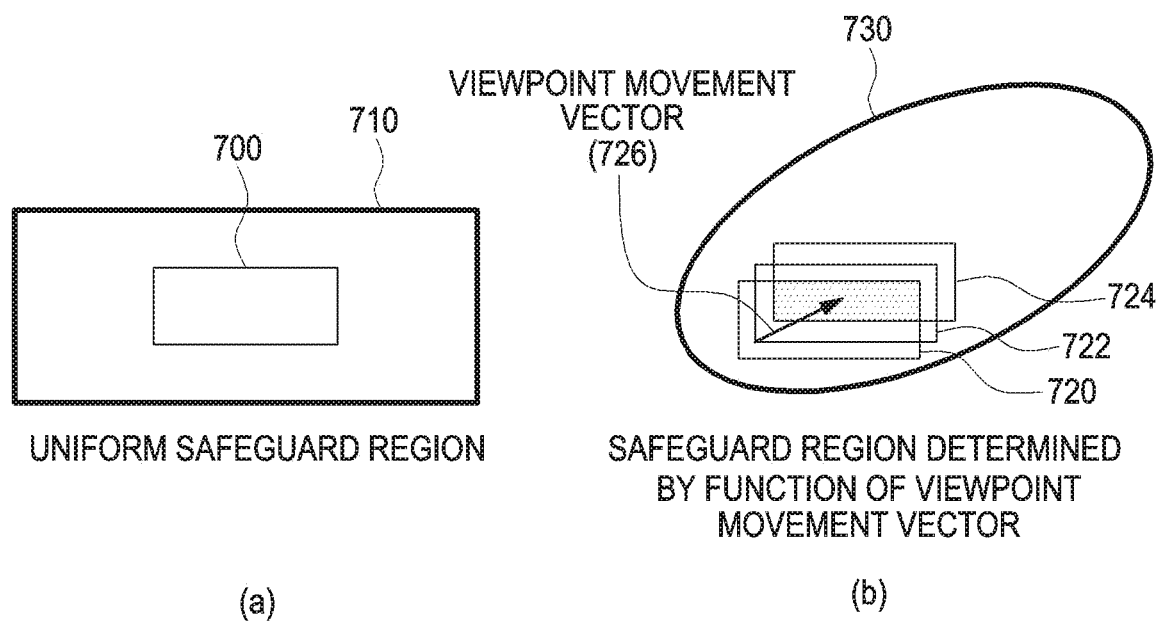
FIG. 7 illustrates a uniform safeguard and a safeguard determined using viewpoint movement information.

FIG. 7 illustrates a uniform safeguard and a safeguard determined using viewpoint movement information.

FIG. 7A illustrates a uniform safeguard determined based on a viewpoint. In this case, one safeguard region 710 surrounding a view region 700 may be fetched by a display device.

FIG. 7B illustrates a flexible safeguard determined based on viewpoint movement information. In this case, when a view region is changed in order of 720, 722, and 724 due to a change in a user's viewpoint, the display device may determine a region 730 that reflects a change in the viewpoint as the safeguard through a viewpoint movement vector 726 indicating the change in the viewpoint. The viewpoint movement vector may be acquired by a device such as a controller included within the display device.

Selectively, the display device may further perform pre-tile fetching based on metadata on a point of interest of the user.

Each frame and a scene within content may have a region of higher interest compared to other regions within the stitched image. In order to quickly render the region of high interest, the region of interest may be identified by the display device through metadata and "pre-fetched". Further, as a method of preventing a "missing tile" in the view region corresponding to the user's viewpoint, not only tiles covering the region of interest may be pre-fetched but also tiles on a path connecting regions of interest or tiles on a path connecting the current viewpoint to the region of interest may be pre-fetched.

In addition, in order to prevent the missing file in the view region, various combinations of the methods can be applied.

Figure 8:
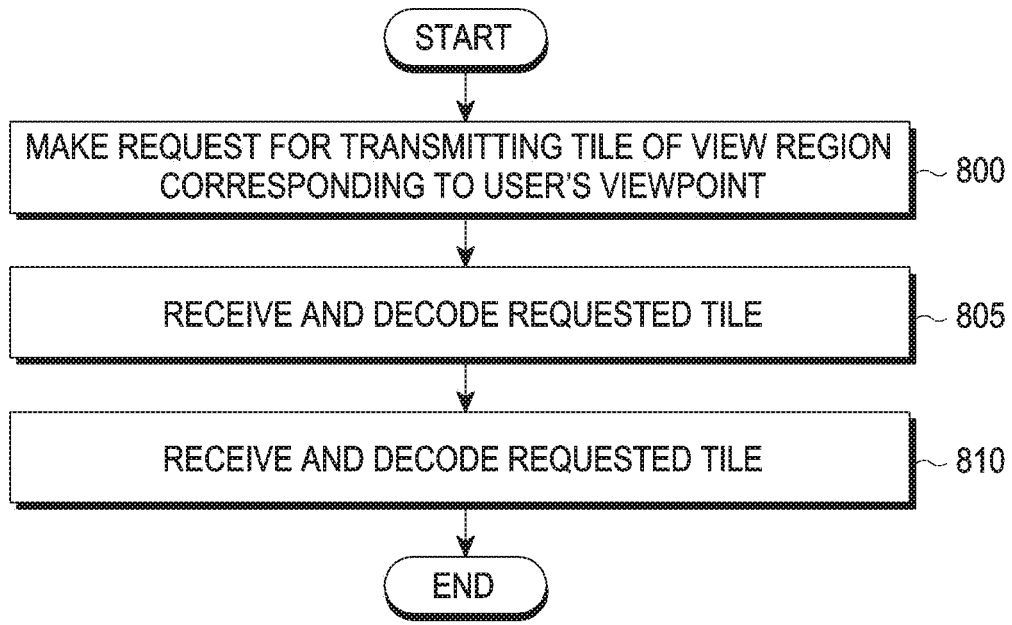
FIG. 8 illustrates a method for displaying by a display device VR content according to the present disclosure.

FIG. 8 illustrates a method for displaying by a display device VR content according to the present disclosure.

The display device may make a request for transmitting a tile in a view region corresponding to a user's viewpoint in step 800. The request may be transmitted to, for example, a VR content provider or a server. The VR content may be, for example, a 360 degree image, and the 360 degree image may be encoded and delivered in the unit of tiles. Selectively, the 360 degree image may be encoded with a resolution higher than or equal to 8 K, and tiles corresponding to the view region may be decoded with a resolution (for example, 4 K) corresponding to a maximum capability of the decoder. Accordingly, the user may experience a high quality image in VR content.

The display device may receive at least one tile corresponding to the view region and decode the received tile in step 805.

The display device may render and display the decoded tile on a display unit in step 810. Selectively, the tile requested by the display device may further include a tile within a sub-image region corresponding to a safeguard as well as the tile corresponding to the view region.

At this time, the display device may render only the tile corresponding to the view region, and the tiles corresponding to the safeguard may be used as tiles to be rendered when the view region is changed due to a change in the viewpoint. Selectively, the sub-image region may be determined by a function of a vector indicating movement of the viewpoint. Selectively, the display device may perform an operation of receiving a change in the viewpoint and an operation of rendering the tile within the view region corresponding to the change in the viewpoint. Selectively, the display device may further perform an operation of receiving and decoding a backup image for all of the 360 degree image, and, when the tile within the view region corresponding to the change in the viewpoint does not exist in the at least one decoded tile, the tile within the view region corresponding to the change in the viewpoint may be rendered using the backup image. Selectively, the display device may further perform an operation of making a request for, receiving, and decoding at least one of a tile corresponding to a point of interest, a tile on a path that connects the point of interest to another point of interest, and a tile on a path that connects the point of the interest to the viewpoint.

Figure 9:
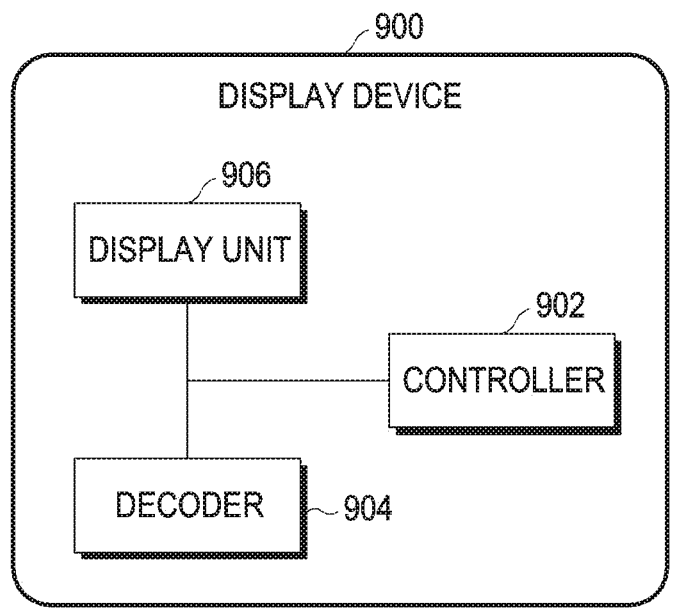
FIG. 9 illustrates a configuration of a display device according to the present disclosure.

FIG. 9 illustrates a configuration of a display device according to the present disclosure.

A display device 900 may include at least one of a controller 902, a display unit 906, and a decoder 904. The display device 900 may display a 360 degree image encoded and transmitted in the unit of tiles.

The controller 902 may request at least one tile corresponding to a view region to be displayed in accordance with a user's viewpoint to the content server and receive at least one tile corresponding to the view region.

The decoder 904 may decode the at least one received tile. Selectively, the 360 degree image may be an image encoded within a resolution higher than or equal to 8 K, and the tile corresponding to the view region may be decoded to have a maximum resolution supported by the decoder. For example, the number of tiles included in the view region may correspond to the maximum resolution supported by the decoder. The controller 902 and the decoder 904 are not necessarily implemented as separated devices, but may be implemented as one module such as a single chip.

The display unit 906 may render and output the at least one decoded tile.

Figure 10:
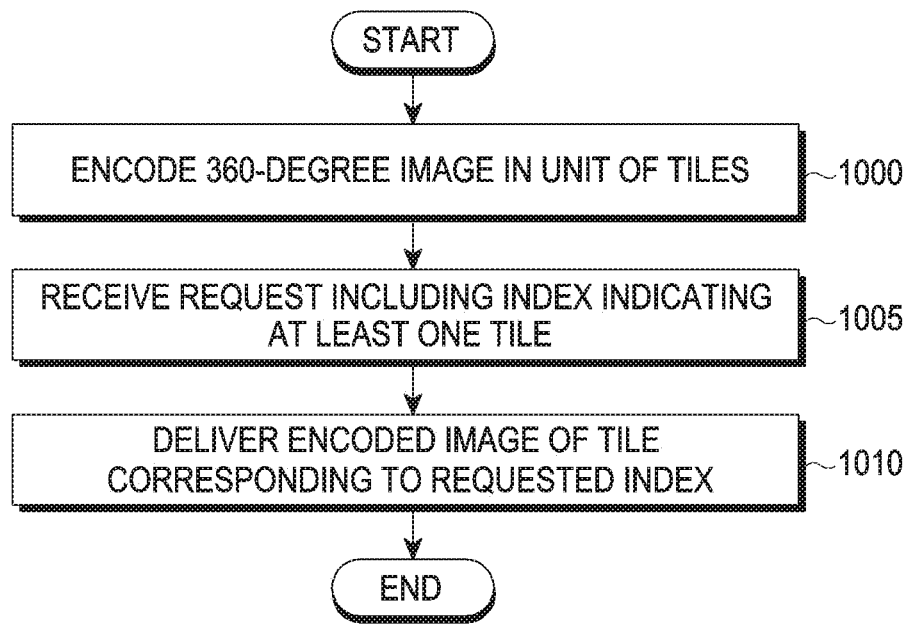
FIG. 10 illustrates a method for providing by a content serverVR content according to the present disclosure.

FIG. 10 illustrates a method for providing by a content server VR content according to the present disclosure.

The content server may encode a 360 degree image in the unit of tiles in step 1000.

The content server may receive a request including an index indicating at least one tile from a display device in step 1005.

The content server may transmit the encoded image of the tile corresponding to the index included in the request to the display device in step 1010. At this time, the index included in the request may indicate a tile within a displayed view region corresponding to a viewpoint of the user of the display device.

Figure 11:
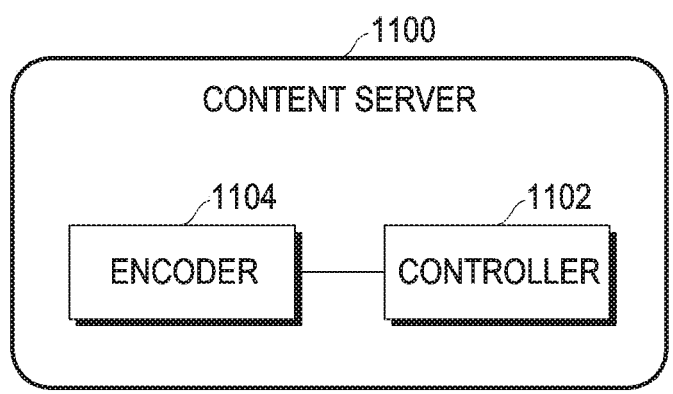
FIG. 11 illustrates an apparatus configuration of a content server according to the present disclosure.

FIG. 11 illustrates an apparatus configuration of a content server according to the present disclosure.

A content server 1100 may include at least one of a controller 1102 and an encoder 1104. The content server 1100 may provide a 360-degree image as an example of VR content.

The encoder 1104 may encode the 360-degree image in the unit of tiles. The tile may be defined according to a position within the 360-degree image.

The controller 1102 may receive a request including an index indicating at least one tile and transmit the encoded image of the tile corresponding to the index included in the request to the display device. At this time, the index included in the request may indicate a tile corresponding to a view region to be displayed in accordance with a viewpoint of the user of the display device. The controller 1102 and the decoder 1104 are not necessarily implemented as separated devices, but may be implemented as one module such as a single chip.

It noted that the diagrams illustrating the example of the view region within the image and the diagrams illustrating the configuration of the method and the apparatus in FIGS. 2 to 11 are not intended to limit the scope of the present disclosure. That is, it should not be construed that all component parts or operations shown in FIGS. 2 and 11 are essential component elements for implementing the present disclosure, and it should be understood that only a few component elements may implement the present disclosure within a scope without departing from the subject matter of the present disclosure.

The above described operations may be implemented by providing a memory device storing corresponding program codes in any constituent unit of a server or UE apparatus in a communication system. That is, the controller of the base station or UE may perform the above described operations by reading and executing the program code stored in the memory device by means of a processor or a Central Processing Unit (CPU).

The entity, the function, the base station, the load manager, various structural elements of the terminal, modules and the like may be operated by using a hardware circuit, e.g., a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an application specific integrated circuit.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. A method of displaying a 360 degree image encoded in a unit of tiles defined as part of the 360 degree image according to a position within the 360 degree image by an electronic device, the method comprising:
   requesting at least one first tile corresponding to a view region to be displayed according to a viewpoint of a user;
   receiving, from a content server, the at least one first tile corresponding to the view region and decoding the at least one received first tile;
   rendering the at least one decoded first tile; and
   in response to identifying that a first sub-image surrounding a changed view region corresponding to a changed viewpoint due to a movement of the viewpoint does not exist,
   receiving, from the content server, a backup image of the 360 degree image, decoding the backup image, and rendering at least one second tile located within the changed view region from among the decoded backup image, or
   identifying a second sub-image surrounding the changed view region based on recent viewpoint movement information for the viewpoint, decoding the second sub-image, and rendering the at least second tile located within the changed view region from among the decoded second sub-image.

2. The method of claim 1, wherein the at least one first tile corresponding to the view region includes at least one tile in the sub-image surrounding the view region within the 360 degree image, and
   wherein the at least one rendered first tile consists of at least one tile located within the view region.

3. The method of claim 1, further comprising:
   detecting that the viewpoint has changed; and
   rendering the at least one second tile located within the changed view region corresponding to the changed viewpoint.

4. The method of claim 1, wherein the backup image is an image having a lower spatial resolution or a lower frame rate than the at least one decoded tile or an image compressed using a higher quantization parameter than the at least one decoded tile.

5. The method of claim 1, wherein the second sub-image has a region determined by a function of a vector indicating the movement of the viewpoint.

6. The method of claim 1, further comprising:
   requesting, receiving, and decoding at least one of a tile corresponding to a point of interest, a tile on a path that connects the point of interest to another point of interest, and a tile on a path that connects the point of interest to the viewpoint.

7. The method of claim 1, further comprising:
   detecting that the viewpoint has changed;
   requesting a parameter corresponding to the change in the viewpoint; and
   receiving the at least one second tile corresponding to the change in the viewpoint.

8. An electronic device for displaying a 360 degree image encoded in a unit of tiles defined as part of the 360 degree image according to a position within the 360 degree image, the electronic device comprising:
   a controller configured to request at least one tile corresponding to a view region to be displayed according to a viewpoint of a user and receive at least one first tile corresponding to the view region from a content server;
   a decoder configured to decode the at least one first tile; and
   a display configured to render the at least one decoded first tile,
   wherein the controller is further configured to:
   in response to identifying that a first sub-image surrounding a changed view region corresponding to a changed viewpoint due to a movement of the viewpoint does not exist,
   receive, from the content server, a backup image of the 360 degree image, control the decoder to decode the backup image, and control the display to render at least one second tile located within the changed view region from among the decoded backup image, or
   identify a second sub-image surrounding the changed view region based on recent viewpoint movement information for the viewpoint, control the decoder to decode the second sub-image, and control the display to render the at least second tile located within the changed view region from among the decoded second sub-image.

9. The electronic device of claim 8, wherein the at least one first tile corresponding to the view region includes at least one tile in the first sub-image surrounding the view region within the 360 degree image, and wherein the at least one rendered first tile includes at least one tile located within the view region.

10. The electronic device of claim 8, wherein the controller is configured to detect that the viewpoint has changed, and the display is configured to render at least one tile located within a changed view region corresponding to the changed viewpoint.

11. The electronic device of claim 8, wherein the backup image is an image having a lower spatial resolution or a lower frame rate than the at least one decoded tile or an image compressed using a higher quantization parameter than the at least one decoded tile.

* * * * *